(No Model.)
W. R. FORD.
PISTON ROD PACKING.
No. 379,272.　　　　　　Patented Mar. 13, 1888.
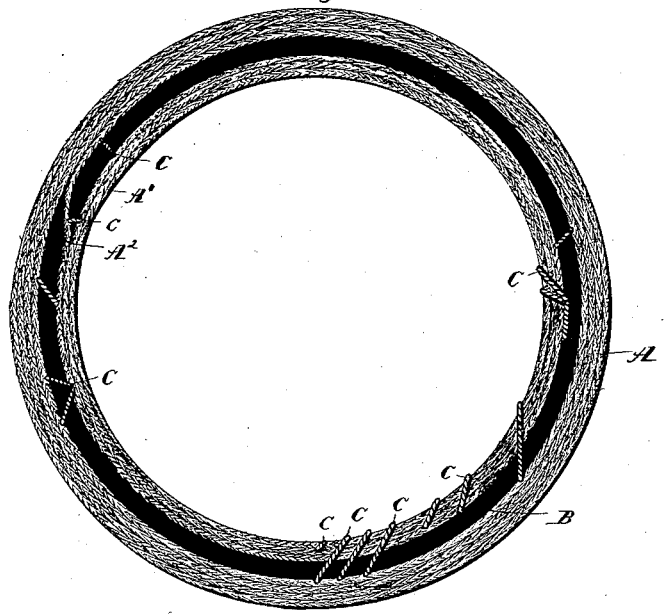
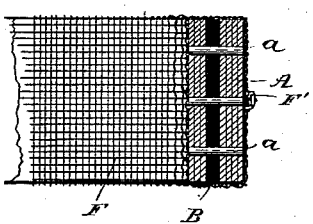
Witnesses
Edwin L. Bradford.
Frank Darian.
W. R. Ford,
Inventor
By his Attorney

UNITED STATES PATENT OFFICE.

WILLIAM ROBERT FORD, OF ALLEGHENY CITY, PENNSYLVANIA, ASSIGNOR TO CHARLES WALKER AND JAMES B. WALKER, BOTH OF SAME PLACE.

PISTON-ROD PACKING.

SPECIFICATION forming part of Letters Patent No. 379,272, dated March 13, 1888.

Application filed June 28, 1887. Serial No. 242,747. (No model.)

*To all whom it may concern:*

Be it known that I, WILLIAM ROBERT FORD, a citizen of the United States, residing at Allegheny City, in the county of Allegheny and State of Pennsylvania, have invented certain new and useful Improvements in Piston-Rod Packing, of which the following is so full, clear, and exact a description as will enable others skilled in the art to which my invention appertains to make and use the same, reference being had to the appended drawings.

The object of my invention is to produce a packing which will retain the lubricant and keep it in place around the piston and at the same time prevent the escape of the oil and prevent its wasting.

Another object of my invention is to produce a packing which will be so stiff as to preserve its shape and at the same time sufficiently flexible to facilitate its ready adjustment to the piston while the same is operated.

The invention consists in the novel construction and arrangement of parts, as will be hereinafter fully explained, and particularly pointed out in the claims at the end of the specification.

In the accompanying drawings, Figure 1 is a side elevation of one form of my improved packing. Fig. 2 is a section thereof, showing a piece of wire-gauze lapped to the edges of the fabric and means for securing the fabric and central rubber piece together.

Throughout the accompanying figures, A designates the main layers of the packing, which is made of fabric, and in the center of which in Fig. 1 is shown a rubber strip, B, which is placed about centrally between the different layers of the fabric A. This rubber strip B is sufficiently rigid to keep the packing in shape, while at the same time it is sufficiently flexible to allow the packing to adjust itself to the piston while the same is operated.

C designates a cable or stitching cord, which is made of string or of wire, as may be preferred. The strip of fabric A is wound round and round from the point A' to the point A², and then the layer of rubber B is put in between the different layers of the fabric A and the whole structure of the packing is fastened together by the cords or other suitable cables, C.

As shown in Fig. 2, the packing is provided with pegs a a, which serve to keep the fabric and rubber central piece, B, in position and guard the same against accidental displacement, while the cables C serve as an additional means of keeping the layers of fabric A in position with relation to the central packing, B, of rubber.

In the device shown in Fig. 2 the entire structure is inclosed within a netting or wire-gauze, F, which is designed to be lapped at its outer edges and fastened down at said edges in such a manner as to form a compact interlocking joint, which will be comparatively smooth on its surface and which will serve to hold the packing in shape, and by fastening it in position with the cable C there will be little or no liability of the accidental displacement of wire-gauze or of any of the various parts used in the construction of the packing.

The fabric is to be saturated with oil or tallow and beeswax in the usual manner.

I do not wish to be understood as limiting myself to the exact construction shown, as various changes may be made in the details of construction without departing from the spirit of my invention and without in any way interfering with its usefulness.

Having now described the objects, uses, and advantages of my device, what I desire to secure by Letters Patent, and what I therefore claim, is—

1. A packing consisting of layers of fabric with a flexible strip secured within the packing between the various layers of the fabric and secured together by a lacing or cable of cord or wire, substantially as and for the purposes specified.

2. In a packing of the character described, the combination of the various layers of fabric having a central flexible strip in between and said strips secured together, the entire structure inclosed by a gauze wrapper overlapped at its outer edges and fastened down at said edges, all constructed and combined to operate substantially as and for the purposes specified.

In testimony whereof I affix my signature in presence of two witnesses.

WILLIAM ROBERT FORD.

Witnesses:
JAS. B. WALKER,
A. C. HENRY.